United States Patent
Wang et al.

(10) Patent No.: US 10,590,600 B1
(45) Date of Patent: Mar. 17, 2020

(54) ILLUMINATION SYSTEMS WITHIN FABRIC-BASED DEVICES

(71) Applicant: Apple Inc., Cupertino, CA (US)

(72) Inventors: Paul Xiaopeng Wang, Cupertino, CA (US); Christopher T. Lebedeff, Santa Clara, CA (US); Joel N. Ruscher, Fremont, CA (US); Zheng Gao, Sunnyvale, CA (US); Siddhartha Hegde, San Jose, CA (US); Zhengyu Li, Shanghai (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/408,215

(22) Filed: Jan. 17, 2017

Related U.S. Application Data

(60) Provisional application No. 62/280,387, filed on Jan. 19, 2016.

(51) Int. Cl.
| | | |
|---|---|---|
| *F21V 11/14* | (2006.01) | |
| *H01H 13/83* | (2006.01) | |
| *D06N 7/00* | (2006.01) | |
| *H01H 13/02* | (2006.01) | |

(52) U.S. Cl.
CPC ............ *D06N 7/0092* (2013.01); *F21V 11/14* (2013.01); *H01H 13/023* (2013.01); *H01H 13/83* (2013.01); *D06N 2201/02* (2013.01); *D06N 2209/0853* (2013.01); *D06N 2209/0861* (2013.01); *D06N 2209/0869* (2013.01)

(58) Field of Classification Search
CPC ...... F21V 11/14; H01H 13/023; H01H 13/83; H01H 13/704; H01H 2209/022; G06F 3/0221

USPC .......................... 200/310, 313, 314; 345/170
See application file for complete search history.

(56) References Cited

U.S. PATENT DOCUMENTS

| | | | |
|---|---|---|---|
| 4,772,769 A | 9/1988 | Shumate | |
| 7,057,125 B1 | 6/2006 | Tsai | |
| 7,201,508 B2* | 4/2007 | Misaras | B60K 37/06 362/551 |
| 7,301,112 B1 | 11/2007 | Tsai | |
| 7,939,773 B2 | 5/2011 | Tsai | |
| 8,188,474 B2* | 5/2012 | Hatano | H01L 27/1214 257/222 |
| 8,556,319 B2* | 10/2013 | Petouhoff | B60N 2/58 296/1.08 |
| 9,390,869 B2* | 7/2016 | Lee | H01H 13/85 |
| 2006/0146027 A1 | 7/2006 | Tracy et al. | |
| 2007/0235307 A1 | 10/2007 | Liao et al. | |

(Continued)

*Primary Examiner* — Vanessa Girardi
(74) *Attorney, Agent, or Firm* — Treyz Law Group, P.C.; G. Victor Treyz; Kendall W. Abbasi

(57) ABSTRACT

An item such as a fabric-based item may have a layer of fabric with openings that are illuminated by a light source. The openings may form symbols or other shapes and may serve as labels for keyboard keys or other components. The fabric may be formed from transparent strands of material that are coated with opaque material or may be formed from opaque strands of material in which openings are formed by laser drilling. The openings may be covered with a transparent coating layer such as a translucent polymer coating. Translucent material on the fabric may be patterned to form parts of the labels or other shapes created by the illuminated openings.

16 Claims, 17 Drawing Sheets

(56) References Cited

U.S. PATENT DOCUMENTS

| | | | |
|---|---|---|---|
| 2015/0234108 A1* | 8/2015 | Harley, Jr. | G02B 6/005 |
| | | | 362/606 |
| 2015/0338883 A1 | 11/2015 | Farahani et al. | |
| 2016/0049266 A1 | 2/2016 | Stringer et al. | |
| 2016/0146450 A1* | 5/2016 | Benhamou | F21V 33/0008 |
| | | | 362/555 |

* cited by examiner

ILLUMINATION SYSTEMS WITHIN FABRIC-BASED DEVICES

CROSS-REFERENCE TO RELATED APPLICATION

This application claims the benefit of provisional patent application No. 62/280,387 filed Jan. 19, 2016, which is hereby incorporated by reference herein in its entirety.

FIELD

This relates generally to fabric-based items, and, more particularly, to systems for providing fabric-based items with illumination.

BACKGROUND

Fabric can be formed by weaving and other techniques for intertwining strands of material. Fabric is sometimes used in forming structures in electronic equipment. A layer of fabric may, for example, be used to cover the keys in a keyboard.

In some keyboards, internal light sources are used to backlight key labels. The incorporation of a fabric cover layer in a keyboard poses challenges. If care is not taken, key labels may not be visible, keyboard structures may not be durable, or keyboard structures may be bulkier than desired. Similar challenges may arise in connection with other types of fabric-based items containing sources of illumination.

SUMMARY

An item such as a fabric-based item may have a layer of fabric with illuminated openings. The openings may form symbols such as letters and other characters and may be patterned to form labels for keyboard keys or other components.

The fabric may be transparent and may be coated with opaque material or may be formed from opaque strands of material. An opaque coating on a transparent fabric or transparent strands of material that are formed in selected areas of an opaque fabric may be patterned to form transparent openings. Patterned opaque coating layers may also be formed on keyboard keys and other structures.

Openings in fabric may be covered with a coating such as a transparent polymer coating or may be free of coating layer material. The polymer coating may be formed from a translucent material that is visible on the exterior of the fabric and may be patterned to form parts of the labels or other shapes created by the illuminated openings.

The item may be a fabric-covered keyboard or other item with movable structures. In an item such as a fabric keyboard, a fabric layer may overlap an array of movable keyboard key members, each of which is associated with a respective keyboard key and controls operation of an associated switch on a printed circuit. The illuminated openings may form labels for the keyboard keys and may be provided with illumination from light sources mounted on the printed circuit.

DETAILED DESCRIPTION

Figure 1:
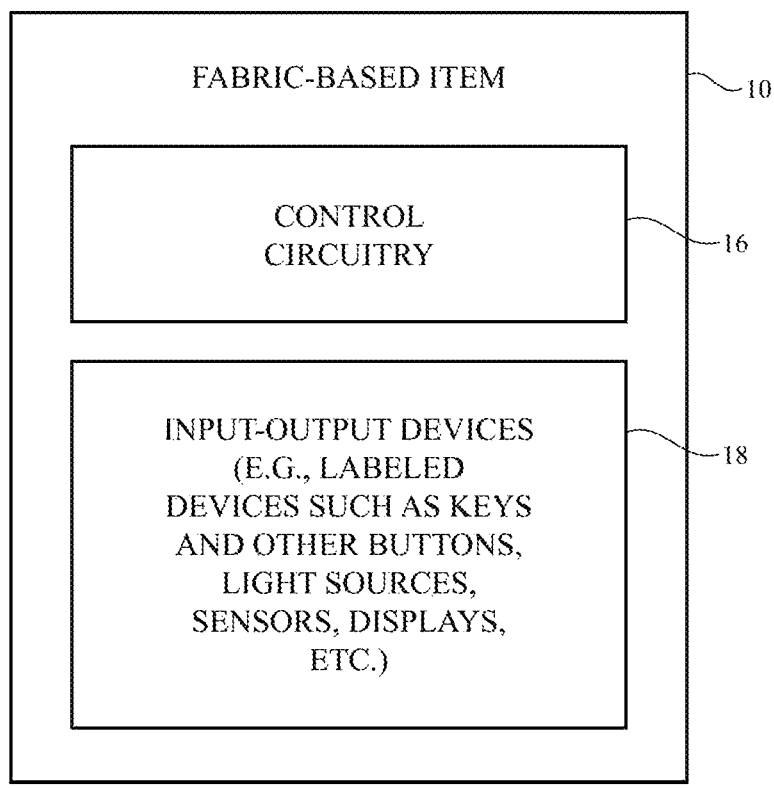
FIG. 1 is a schematic diagram of an illustrative fabric-based item with circuitry in accordance with an embodiment.

Fabric and other materials may be used in forming fabric-based items. For example, fabric may be used in forming portions of a stand-alone electronic device such as a cellular telephone, tablet computer, wrist-watch device, laptop computer, media player, pendant device, a device embedded in eyeglasses or other equipment worn on a user's head, or other electronic equipment, may be used in forming a strap, a case, a cover, or other accessory for an electronic device (e.g., a cover or other accessory that includes a keyboard), may be used in forming accessories such as headphones, may be used in forming straps, pockets, walls in a bag, or parts of other enclosures, may be used in forming seating or other furniture for a home or office, may be used in forming a seat, dashboard, steering wheel, seatbelt, or other item in a vehicle, may be used in forming part of an embedded system such as a system in which fabric-based equipment is mounted in a kiosk, may be used in forming wearable items such as a necklace, wrist band, arm band, shoe, or other item of clothing, may be used in forming a wallet or purse, may be used in forming cushions, blankets, or other household items, may be used in forming toys, may be used in forming other equipment with circuitry, or may be used in forming structures that implement the functionality of two or more of these items.

Items such as these may include circuitry for supporting input-output features and other functionality. In some configurations, the circuitry may contain a light source for generating light that is viewable by a user of the item. The light may be used as general purpose illumination (e.g., light to illuminate an interior portion of a bag or other enclosure), may be used as light that illuminates a user's ambient environment (as with a flashlight), may be used to illuminate a symbol, or other patterned structure on the surface of a keyboard or other item (e.g., a keyboard key label), may serve as backlight illumination or per-pixel illumination for a display having an array of individually adjustable pixels, may provide illumination for a status indicator (e.g., a one-element or multi-element battery strength indicator, a wireless signal strength indicator, a power status indicator, or other symbol for a status indicator), may support wireless light-based communications (e.g., with external equipment), and/or may be used in other light-based applications. Arrangements in which the circuitry of an item includes one or more light sources for providing illumination for a patterned opening in a fabric-based item such as a symbol (glyph) on a keyboard key (e.g., a keyboard key label or other label, etc.) or other pattern may sometimes be described herein as an example. This is, however, merely illustrative. Arrangements in which the light source structures are included in the circuitry of other types of items (e.g., other suitable structures having illuminated symbols and other patterns) and in which other types of illumination are generated may be used, if desired.

An illustrative arrangement for an item that includes circuitry with one or more light sources is shown in FIG. 1. As shown in FIG. 1, item 10 may be a fabric-based item (as an example). The fabric of item 10 may form all or part of a housing wall for item 10, may form internal structures for item 10, may form surface structures for item 10, or may form other fabric-based structures. The fabric of item 10 may be soft (e.g., item 10 may have a fabric surface that yields to a light touch), may have a rigid feel (e.g., the surface of item 10 may be formed from a stiff fabric), may be coarse, may be smooth, may have ribs or other patterned textures, and/or may be formed as part of a structure that has portions formed from non-fabric structures of plastic, metal, glass, crystalline materials, ceramics, or other materials.

Item 10 may have control circuitry 16. Control circuitry 16 may include storage and processing circuitry for supporting the operation of item 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of item 10. The processing circuitry may be based on one or more microprocessors, microcontrollers, digital signal processors, baseband processors and other wireless communications circuits, power management units, audio chips, application specific integrated circuits, etc.

Input-output circuitry in item 10 such as input-output devices 18 may be used to allow data to be supplied to item 10 and to allow data to be provided from item 10 to external devices. During operation, control circuitry 16 may use input-output devices 18 to gather input from a user, external equipment, and/or the environment around item 10. Control circuitry 16 may also use input-output devices 18 to provide output to a user or external equipment.

Input-output devices 18 may include switches, buttons, joysticks, scrolling wheels, touch pads, key pads, keyboards, microphones, speakers, tone generators, vibrators, cameras, sensors such as touch sensors, capacitive proximity sensors, light-based proximity sensors, ambient light sensors, compasses, gyroscopes, accelerometers, moisture sensors, force sensors, data ports, displays, and other input-output devices. Keys, buttons, status indicators, displays, trim structures, and other portions of item 18 may be illuminated. For example, light-emitting diodes, lamps, electroluminescent panels, or other sources of light may be used in illuminating patterned openings. The patterned openings may pass through fabric in item 10 and/or other layers of material and may form symbols (e.g., letters and other alphanumeric characters, icons, etc.) or other illuminated shapes. The symbols or other patterned openings may form labels on keys, buttons, or other input-output devices, may form labels on other illuminated structures, may form trim for a component (e.g., a halo surrounding a key), or may form other suitable illuminated area. Arrangements in which patterned openings or other transparent structures in one or more fabric layers in item 10 are used in forming illuminated letters or other symbols that serve as labels for input-output components such as keys and buttons may sometimes be described herein as an example. In general, however, input-output devices 18 may include one or more light sources that provide any suitable type of illumination for a user of item 10.

Figure 2:
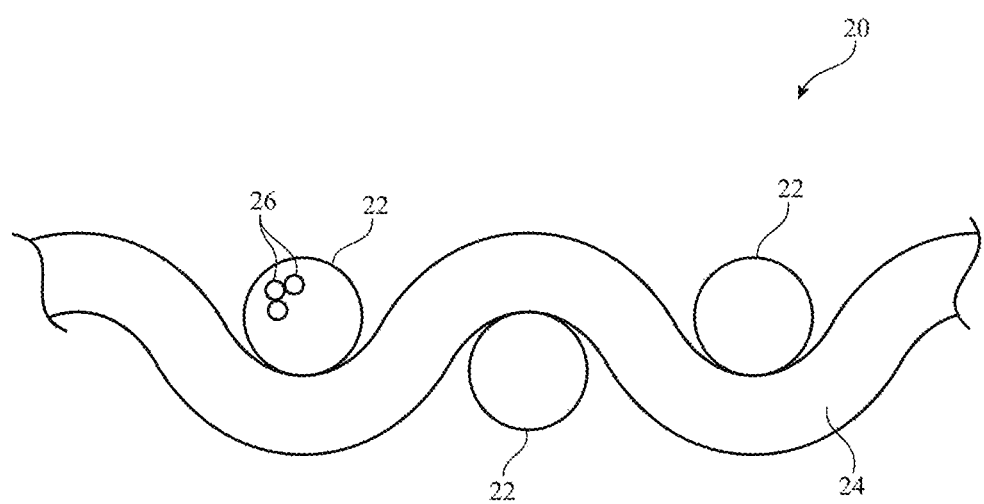
FIG. 2 is a cross-sectional side view of illustrative fabric in accordance with an embodiment.

Fabric for item 10 may be formed from intertwined strands of material. A cross-sectional side view of an illustrative layer of fabric for item 10 is shown in FIG. 2. As shown in FIG. 2, fabric 20 may include strands of material such as strands 22 and strands 24. With one suitable arrangement, fabric 20 may be a woven fabric (e.g., strands 22 may be warp strands and strands 24 may be weft strands). Other arrangements may be used for intertwining strands of material for forming fabric 20 for item 10, if desired. In general, fabric 20 may be woven, knitted, braided, may be intertwined to form felt, or may contain strands of material that have been intertwined using other intertwining techniques. In some arrangements, fabric 20 may include coatings (e.g., polymer coatings to prevent accumulation of dirt, materials that serve as moisture barrier layers, wear resistant coatings, transparent coatings such as patterned translucent coatings, etc.). These coating materials may penetrate into fabric 20 and/or may form layers on the inner and/or outer surfaces of fabric 20.

The strands of material that form the fabric may be monofilaments, may be multifilament strands (sometimes referred to herein as yarns or threads), may be formed from metal (e.g., metal monofilaments and/or yarns formed from multiple monofilament wires), may be formed from dielectric (e.g., polymer monofilaments and yarns formed from multiple polymer monofilaments), may include dielectric cores covered with conductive coatings such as metal (e.g., metal coated dielectric monofilaments and yarns of metal coated polymer-core monofilaments may be used to form conductive monofilaments and conductive yarns, respectively), may include outer insulating coatings (e.g., coatings of polymers or other dielectrics may surround each metal-clad polymer monofilament or each collection of metal-clad polymer monofilaments in a yarn, polymer insulation may enclose a multifilament metal wire, etc.), or may be other suitable strands of material for forming fabric.

As shown in the illustrative configuration of fabric 20 of FIG. 2, for example, strands such as strands 22 and 24 may be formed from strands of yarn that each contain multiple monofilaments 26. Configurations in which the fabric is formed from yarns (e.g., multifilament strands of material that are insulating or that contain metal wires and/or metal coatings on polymer monofilaments to render the yarns conductive) may sometimes be described herein as an example. This is, however, merely illustrative. Fabric 20 may be formed using monofilaments, multifilament strands of material (yarns), combinations of these arrangements, etc. The diameter of strands 22 and 24 that are formed from yarns containing multiple monofilaments may be, for example, 0.25 mm, may be 0.1 to 0.5 mm, may be more than 0.2 mm, may be less than 2 mm, or may be any other suitable diameter (width).

To allow light to pass through fabric 20 in item 10, fabric 20 and/or other layers of material in item 10 may be provided with transparent portions. The transparent portions may be formed from air-filled openings in opaque fabric and/or other opaque materials, may be formed from openings that are filled with transparent material (e.g., haze-free clear material or hazy translucent material), or may be formed from other structures that allow light to pass. In some configurations, an opaque fabric coating or other opaque layer may be provided with a patterned opening in addition to or instead of providing fabric 20 with patterned openings. Combinations of these approaches and/or other arrangements for providing illuminated structures in item 10 may be used, if desired.

Figure 3:
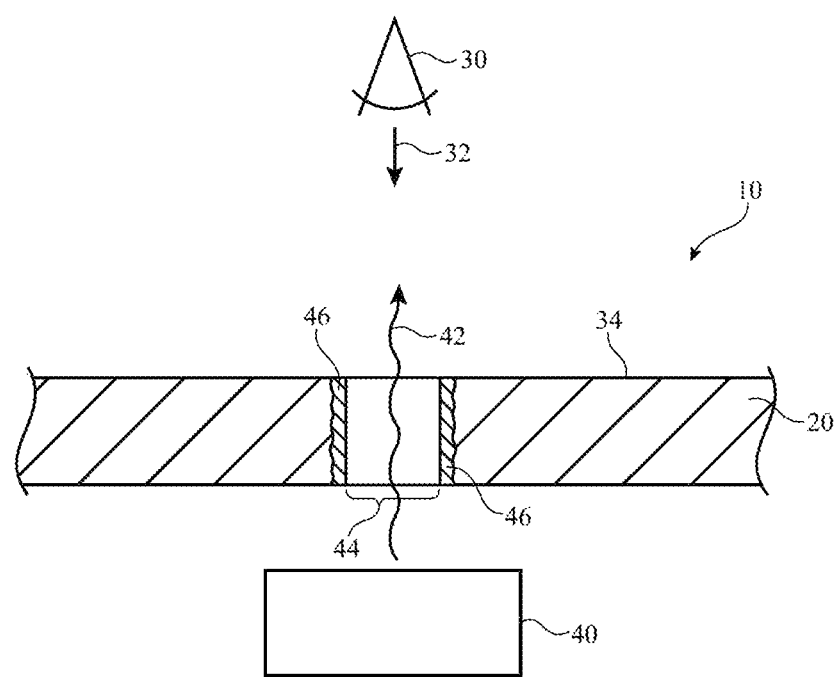
FIG. 3 is a cross-sectional side view of a fabric layer with an illuminated opening in accordance with an embodiment.

A side view of an illustrative fabric-based item having a layer of material such as a fabric layer with an opening is shown in FIG. 3. As shown in FIG. 3, a viewer such as viewer 30 may view exterior surface 34 of item 10 in direction 32. Item 10 may include a layer material such as layer 20 that forms outer surface 34. Layer 20 may include one or more layers of fabric or other materials (e.g., layer 20 may be a layer of fabric and/or may have other layers of material such as plastic layers or other layers of material, and/or other structures). A light source such as light source 40 may be formed in the interior of item 10. Light source 40 may be formed from one or more light-emitting diodes (e.g., organic light-emitting diodes, light-emitting diode dies formed from crystalline semiconductor, quantum dot light-emitting diodes, etc.), may be formed from one or more lamps, may be formed from one or more electroluminescent panels, may be formed from diode lasers or other laser light sources, or may be formed from other suitable light generating devices. Light source 40 may generate light at visible wavelengths, infrared wavelengths, and/or ultraviolet wavelengths. For example, light source 40 may generate visible light illumination 42.

Layer 20 may have openings such as opening 44. Opening 44 (or a set of openings such as opening 44) may have the shape of an alphanumeric character or other symbol (glyph), may serve as a label for a component or other label or trim, or may have any other suitable shape. As shown in FIG. 3, opening 44 (i.e., the symbol, label, or other patterned structure formed from opening 44 or set of openings 44) may be illuminated with illumination 42 (i.e., illumination 42 may serve as backlight for opening 44). Because opening 44 may have a shape that forms a symbol or other desired pattern, openings such as opening 44 of FIG. 3 may sometimes be referred to as patterned openings.

Openings such as opening 44 of FIG. 3 may be formed by stamping (punching), cutting, machining, plasma cutting, waterjet cutting, heating, ablation, chemical removal (e.g., polymer dissolving techniques, metal etching techniques, etc.), laser-based techniques (sometimes referred to as laser hole formation or laser drilling), and/or other suitable material removal techniques. Openings such as opening 44 may also be formed during the process of fabricating some or all of layer 20 (e.g., by molding openings into layer 20 as layer 20 is formed during a plastic molding process, by intertwining strands of material so that openings are formed as layer 20 is constructed, or by using other fabrication techniques in which openings such as opening 44 are formed during fabrication of layer 20 rather than by removing material from layer 20 after layer 20 has been fabricated). In some configurations, laser light or other energy that is used in forming opening 44 may create melted sidewall portions 46 on the interior portions (inner sidewalls) of opening 44. These portions (sometimes referred to as cauterized portions or melted portions) may be formed when thermoplastic polymer material or other material in one or more strands of material in layer 20 melts and resolidified as part of a laser drilling process. The laser drilling process may form opening 44 and, through the melting process, may help secure loose ends of the strands of material in layer 20 that have been severed during laser drilling).

Figure 4:
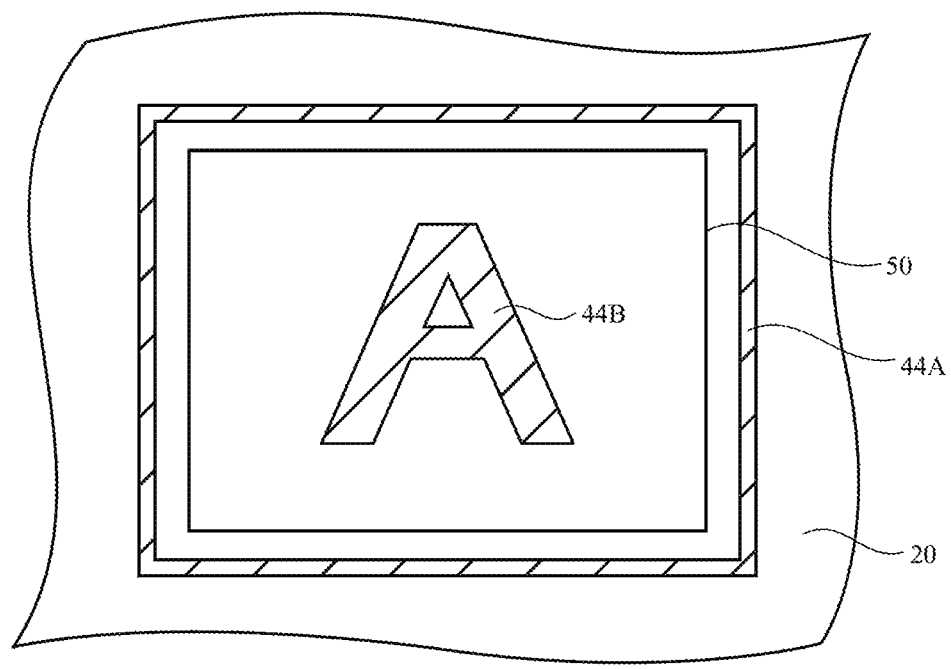
FIG. 4 is a top view of an illuminated fabric structure such as a keyboard key in accordance with an embodiment.

Patterned openings in fabric and/or other materials (see, e.g., layer 20 of FIG. 3) may be used in forming illuminated patterns in item 10. As shown in FIG. 4, layer 20 may overlap an input-output component such as key 50. Key 50 may form part of a keyboard in item 10 (e.g., item 10 may be an accessory such as a cover that contains a keyboard or other device that contains keys). Key 50 may be surrounded by opening 44A, which forms an illuminated trim (i.e., an illuminated ring-shaped halo that runs around the periphery of key 50). Key 50 may also have an opening such as opening 44B that is illuminated. Opening 44B may form a symbol or other pattern. For example, opening 44B may form a label for key 50 (e.g., opening 44B may be patterned to form an alphanumeric character such as the letter "A" or other symbol associated with the operation of the key).

Openings such as opening 44B of FIG. 4 may be formed from a set of small openings (sometimes referred to as perforations) or may be formed from one or more larger contiguous openings. In some configurations, printed ink or other coating material may be provided on layer 20 (e.g. on the outer surface of layer 20) to help make the label on key 50 visible to a user in the absence of illumination through openings 44A and/or 44B.

Although illustrative openings 44A and 44B of FIG. 4 are associated with an input-output device in item 10 such as key 50, this is merely an example. Openings such as openings 44A and 44B may have any suitable size and shape, may be formed on any suitable portion of item 10, may form labels, symbols, text, decorative patterns (e.g., trim), parts of status indicators, parts of displays, parts of buttons (e.g., buttons such as power buttons, volume buttons, sleep/wake buttons, and other buttons besides the keys in a keyboard), may be formed on surfaces of item 10 that are not associated with keys, etc. The illuminated key configuration of FIG. 4 is merely an example.

Figure 5:
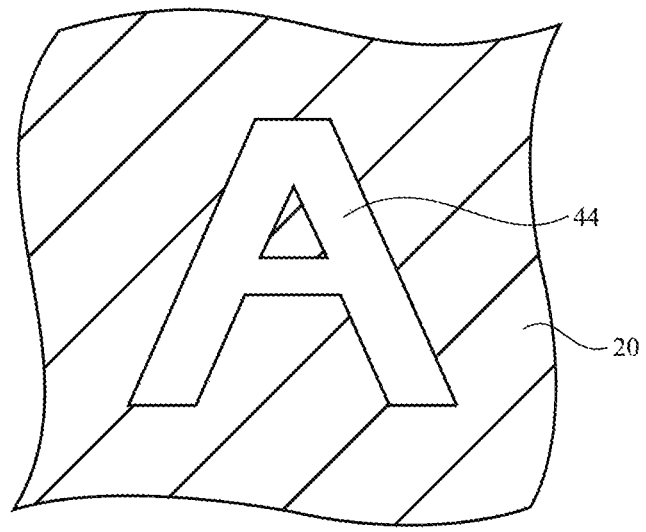
FIG. 5 is a top view of an illustrative fabric structure with an illuminated opening such as an illuminated symbol in accordance with an embodiment.

FIG. 5 is a top view of an illustrative illuminated patterned opening 44 having the shape of the letter "A". Opening 44 of FIG. 5 may have a solid (non-perforated) opening shape through which illumination passes to a viewer. Opening 44 may be filled with transparent material (e.g., material through which light 42 may pass from light source 40). The transparent material may be formed from a haze-free clear material (e.g., a clear material such as plastic, glass, sapphire or other crystalline materials, etc. with a haze value that is sufficiently low to appear clear and haze-free to the naked eye) or may be formed from translucent material (e.g., a hazy transparent polymer that includes light-scattering particles such as particles of white inorganic materials, light scattering particles of other colors, or other attributes that contribute to a hazy, translucent appearance).

Figure 6:
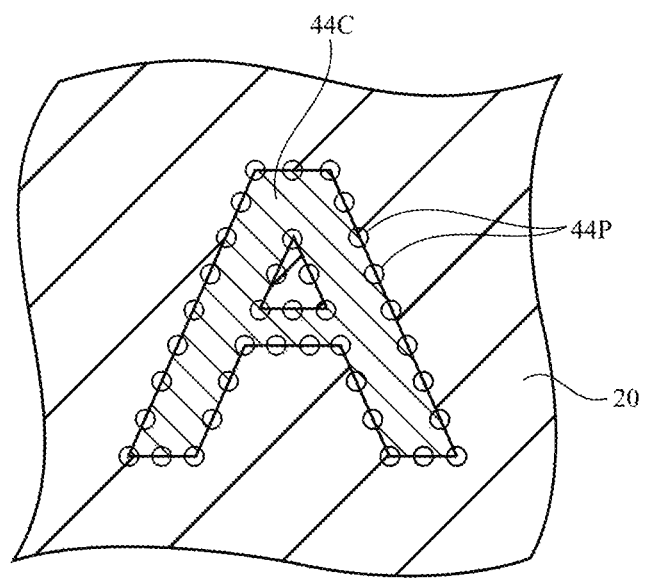
FIG. 6 is a top view of an illustrative fabric structure with a symbol having peripheral illuminated perforations in accordance with an embodiment.

As shown in the example of FIG. 6, openings such as perforations 44P may run along the periphery of the letter "A" and may be illuminated by light 42 from internal light source 40, thereby forming an illuminated patterned opening with an "A" shape. The areas within the letter "A" in this arrangement may be coated with a material (e.g., coating 44C) such as white ink or other material that contrasts with the appearance of the rest of layer 20. This helps ensure that the letter "A" will be visible, even in the absence of illumination from light source 40. Some of coating 44C may penetrate into openings 44P. To allow light to pass through openings 44P, coating 44C may be formed from a transparent material (e.g., a translucent material such as white ink or other whitish material). In addition to letters and other alphanumeric characters, other types of symbols and other patterned shapes may be formed by perforations that follow the outline of the shape being illuminated. The use of an illuminated shape in the form of the letter "A" in FIG. 6 is merely illustrative. If desired, coating 44C may be omitted or may be present only in openings 44P (e.g., to help the location of the illuminated shape visually disappear when illumination is not present).

Figure 7:
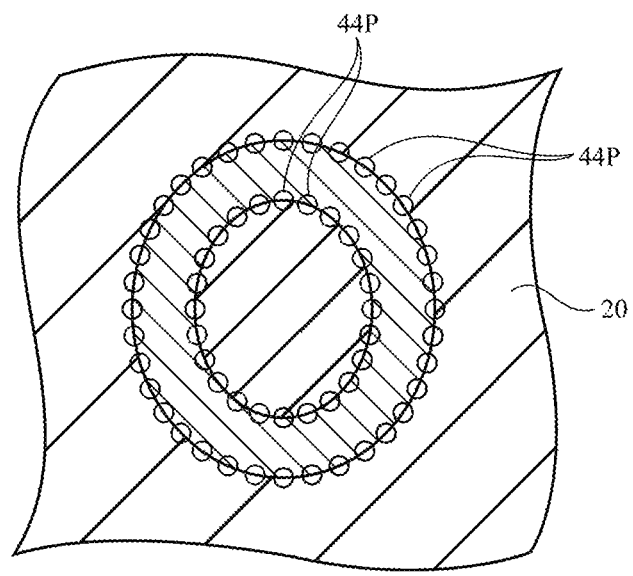
FIG. 7 is a top view of an illustrative fabric structure with a symbol having curved edges with illuminated perforations in accordance with an embodiment.

In some configurations, the symbol or other illuminated shape may have curved edges. As shown in FIG. 7, for example, the letter "0" may have inner and outer curved edges. Illuminated perforations 44P may run along the curved edges to provide the letter "0" of FIG. 7 or other symbol or illuminated shape with a smooth appearance. By arranging perforations 44P along curved edges, staircase effects can be reduced or eliminated.

Figure 8:
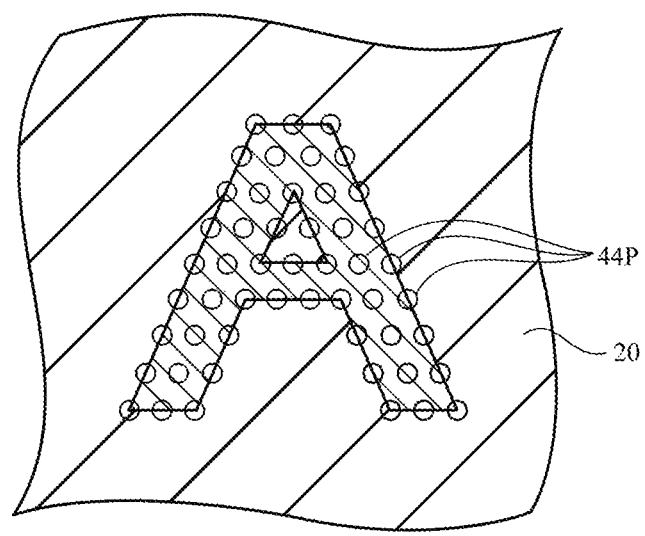
FIG. 8 is a top view of an illustrative structure with a symbol that is illuminated using perforations that fill the symbol in accordance with an embodiment.

If desired, the body of an illuminated shape can be filled with an array of perforations, as shown with the illustrative "A" symbol of FIG. 8. In general, illuminated patterns in item 10 may have contiguous large illuminated openings (e.g., symbol-sized opening for forming a symbol that is entirely illuminated, etc.) and/or may have symbol-sized portions filled with arrays of smaller perforations or sets of perforations that run along the edges of the patterns. The width of a portion of a character (e.g., the letter "A") or other symbol may be, for example, 0.1 to 0.5 mm, more than 0.2 mm, more than 0.3 mm, less than 1 mm, less than 5 mm, or other suitable size. The diameter of perforations such as perforations 44P may be 40 microns, 30-60 microns, 30-70 microns, more than 25 microns, more than 35 microns, more than 50 microns, 50-100 microns, 5-50 microns, less than 200 microns, more than 100 microns, or other suitable diameter. Perforations 44P may have circular shapes or may have other shapes. In configurations in which perforations 44P are arranged in an array to provide a symbol or other pattern with illumination, perforations 44P may be spaced apart from each other by 80-400 microns, by 150 microns, by 100-150 microns, by 50-300 microns, by more than 25 microns, by less than 400 microns, or by other suitable amounts.

Figure 9:
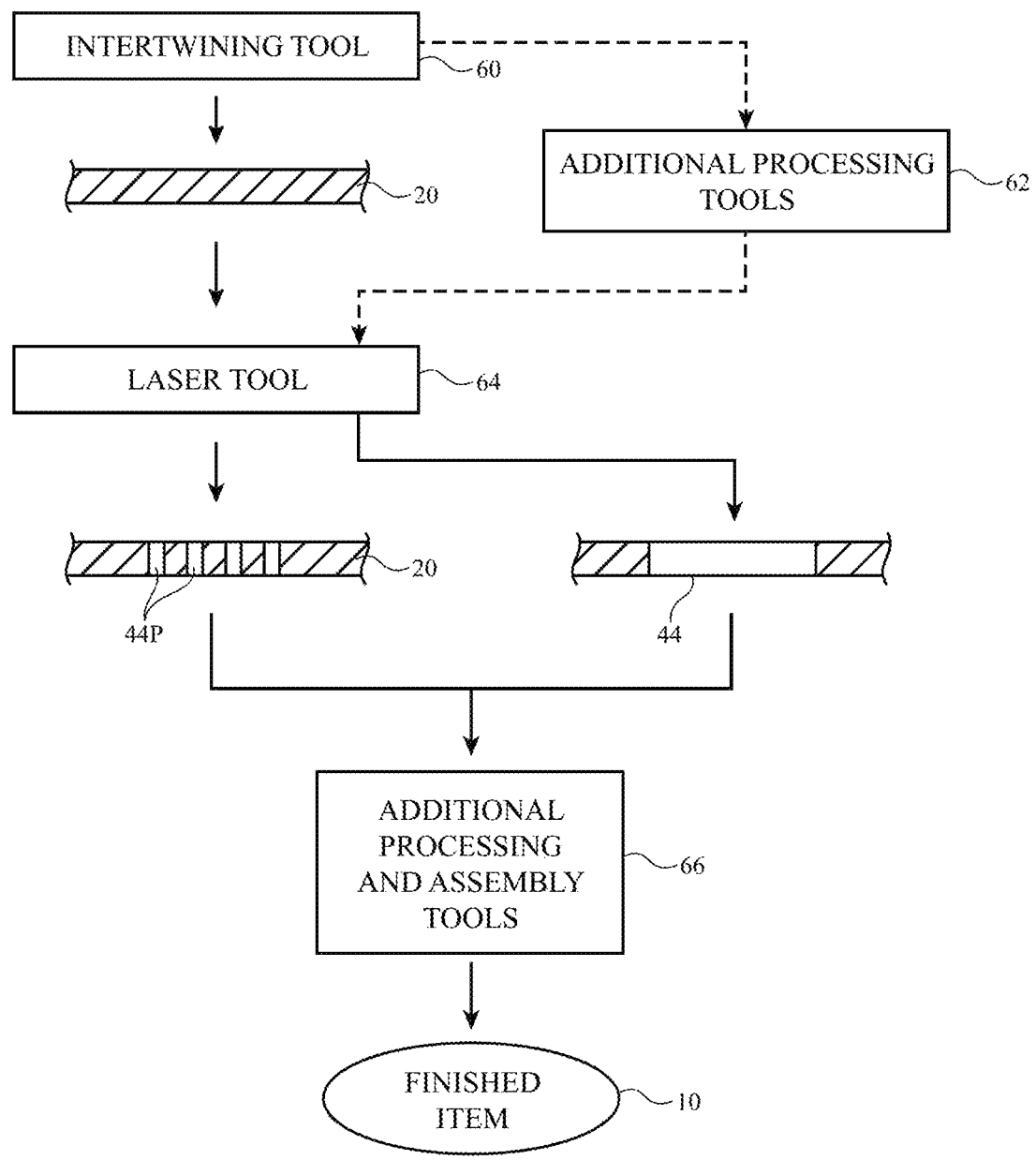
FIG. 9 is a diagram of illustrative equipment and structures involved in forming a fabric-based item with illumination in accordance with an embodiment.

FIG. 9 is a diagram of illustrative equipment and operations involved in forming a structure such as fabric-based item 10.

Intertwining tool 60 may be used in forming intertwined strands of material (e.g., intertwined monofilaments and/or intertwined yarns) using weaving, braiding, knitting, or other fiber intertwining techniques (see, e.g., layer 20, which may include one or more fabric layers). If desired, sheets of polymer, metal, and/or other materials may be attached to one or more fabric layers (e.g., using adhesive, fasteners, or other attachment mechanisms) and/or coating layers formed from polymer, metal, and/or other coating materials may be deposited onto one or more fabric layers using physical vapor deposition, chemical vapor deposition, printing (e.g., screen printing, pad printing, inkjet printing, etc.), electroplating, fusing operations in which materials are fused using heat and/or pressure, molding under heat and pressure, sewing, crimping, or other techniques. If desired, these techniques may be implemented using additional processing tool 62 (e.g., deposition tools, equipment for sewing, printing equipment, etc.), so that layer 20 includes one or more additional layers of polymer, metal, carbon fiber material and other fiber-composite materials, polymer and/or metal coatings, etc.

Following formation of a layer such as layer 20 for item 10 that includes a fabric layer and one or more optional additional layers, laser tool 64 may be used to form patterned openings 44P (e.g., perforations) in layer 20. Laser tool 64 may be a pulsed laser, a continuous wave laser, an infrared laser, a visible-light laser, or an ultraviolet laser. Laser tool 64 may include focusing optics to focus a laser beam from a laser to a small spot (e.g., a spot having a diameter of 1-100 microns, less than 10 microns, more than 5 microns, etc.). Laser tool 64 may produce a laser beam that is oriented perpendicular to the surface of layer 20 (e.g., parallel to the surface normal of layer 20) so that perforations 44P extend perpendicularly to the surface of layer 20 or may produce a laser beam that is oriented at a non-zero angle with respect to the surface normal of layer 20 so that perforations 44P are oriented at a non-zero angle with respect to the surface normal of layer 20 and will therefore extend along a direction that is not perpendicular to the surface of layer 20. In configurations in which perforations 44P extend through layer 20 at an angle (e.g., a non-zero angle with respect to the surface normal of layer 20), the light that is emitted through perforations 44P in layer 20 may be directed at a desired non-perpendicular angle with respect to the surface of layer 20. This allows the viewing angle of the openings formed in layer 20 to be tailored to a particular desired range of angles (e.g., to enhance visibility from shallow viewing angles, to ensure privacy from nearby users, etc.). If desired, the viewing angle of the openings in layer 20 may be enhanced using a laser beam with a non-circular profile. For example, a laser beam with an elliptical shape may be used to form elliptical perforations 44P (e.g., in a configuration in which the laser beam is perpendicular to the surface of layer 20). As an example, perforations 44P with lateral dimensions of 50 µm×90 µm or other lateral dimensions (e.g., a shorter dimension of 10-100µ and a longer dimension of 50-150 µm, etc.) may be formed through layer 20 using a laser beam with an elliptical spot. Arrangements with both off-axis beams and non-circular laser spots may also be used.

If desired, processing tools 62 may form a polymer coating or other coating on a layer of fabric (e.g., layer 20). The coating may, as an example, be transparent to laser light from laser tool 64. Following deposition of the coating, laser tool 64 may form perforations 44P by providing a laser beam that passes through the coating and that is absorbed in layer 20 to remove layer 20 (e.g., by heating, ablation, etc.). With another illustrative technique, the polymer coating or other coating may be applied to a layer of fabric (e.g., layer 20) on a first surface and the perforation-forming laser beam produced by laser tool 64 may be used to illuminate an opposing second surface of the layer of fabric. With this type of technique, perforations 44P may be formed by removing the material of the fabric layer without removing the coating layer (e.g., by laser drilling up to the coating layer but not through the coating layer).

During operations with laser tool 64, a symbol-shaped opening 44 and/or an array of smaller perforations 44P having the shape of a symbol (e.g., a solidly filled symbol or a symbol in which perforations 44P are arranged along the symbol edges) may be formed to allow illumination 42 to pass through layer 20. One or more pulses of light from laser tool 64 may be used in drilling each perforation or other opening in layer 20. Laser-drilled openings may pass fully or part way through one or more fabric layers and/or one or more non-fabric layers.

After forming perforations 44P and/or larger symbol-sized openings in layer 20, additional processing and assembly tools 66 may be used to assemble processed layer 20 with other components to complete fabrication of item 10. Tools 66 may include tools for attaching one or more layers of material and/or other structures to a layer 20, tools for mounting light sources, switches, and other components on printed circuit boards, and tools such as computer-controlled positioners for attaching layer 20 and other structures together to form item 10. When assembled, light sources such as light source 40 may be aligned with the openings in the fabric layer and other openings in layer 20, so that the openings may be illuminated by light 42 from light source(s) 40.

Figure 10:
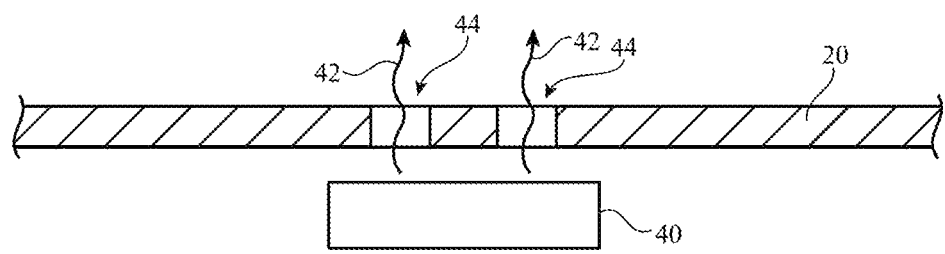
FIG. 10 is a cross-sectional side view of an illustrative structure with illuminated openings in accordance with an embodiment.

A cross-sectional side view of an illustrative layer (e.g., a fabric layer and/or other layers) such as layer 20 in which one or more openings 44 have been formed is shown in FIG. 10. As shown in FIG. 10, light source 40 may be aligned with openings 44 so that light 42 passes through openings 44. Openings 44 may also be used to allow ambient light or other light from the exterior of item 10 to reach light sensitive components within device 10, if desired. Arrangements in which openings 44 are illuminated by interior lighting such as light source 40 may sometimes be described herein as an example.

Figure 11:
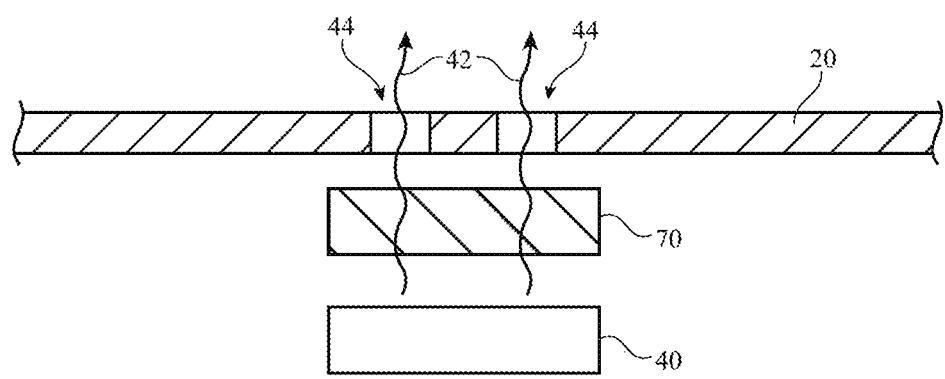
FIG. 11 is a cross-sectional side view of an illustrative structure with illuminated openings and an underlying structural component such as a keyboard key or other movable member in accordance with an embodiment.

If desired, movable members or other structures may be at least partly interposed between openings 44 and light source 40, as shown by illustrative key member 70 of FIG. 11. As shown in FIG. 11, light 42 from light source 40 may pass through one or more openings in member 70, may pass through one or more transparent portions of member 70, or may pass by member 70 (e.g., behind member 70 in the illustrative diagram of FIG. 11). Member 70 of FIG. 11 is a movable key member (e.g., a key in a keyboard). If desired, member 70 may be a button member for an isolated (non-keyboard) button, may be a support structure for an electrical component in item 10, may be a housing wall structure, or may be any other suitable structure in item 10. Member 70 may be formed from one or more materials (e.g., polymer, glass, metal, etc.).

Figure 12:
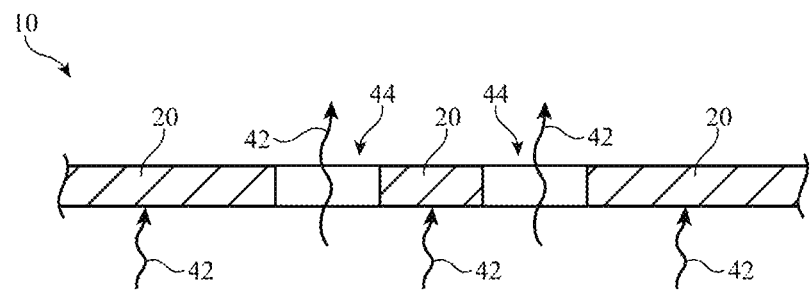
FIG. 12 is a cross-sectional side view of an illustrative opaque fabric layer with illuminated openings in accordance with an embodiment.

FIG. 12 is a cross-sectional side view of layer 20 in an illustrative configuration in which layer 20 is an opaque fabric layer. The color of the opaque fabric layer may be black, dark gray, dark blue, or other opaque color. With this type of arrangement, illumination 42 that strikes fabric layer 20 will be blocked, but illumination 42 that strikes openings 44 will pass through layer 20 for viewing by a user external to item 10. Openings 44 may be perforations and/or symbol-sized openings and may be filled with air (i.e., openings 44 of FIG. 12 may be free of fabric, coatings, and other materials).

Figure 13:
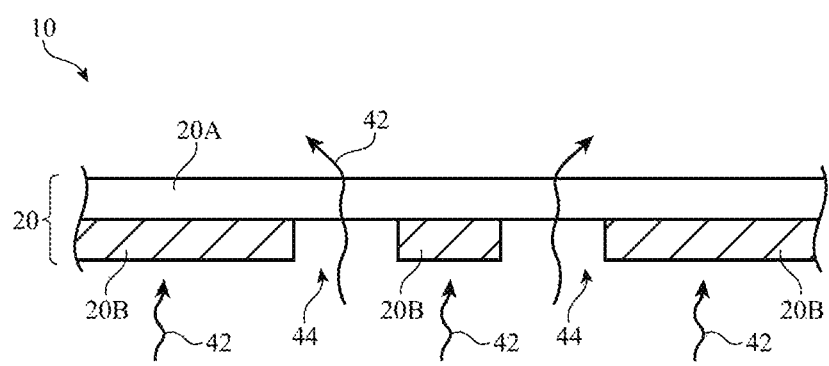
FIG. 13 is a cross-sectional side view of an illustrative transparent fabric layer with an associated opaque layer such as an opaque coating having illuminated openings in accordance with an embodiment.

As shown in the illustrative configuration of FIG. 13, layer 20 may include fabric layer 20A and one or more additional layers such as layer 20B. Layer(s) 20B may be formed on the upper and/or lower surface of layer 20A and may be formed from an opaque layer of material such a polymer layer, metal layer, or other layer of material. As an example, layer 20B may be formed from an opaque polymer layer such as a layer of black ink (e.g., a polymer binder containing black particles of material such as particles of carbon black, etc.) or a polymer containing other opaque materials. Layer 20B may be deposited by printing techniques (e.g., screen printing, pad printing, inkjet printing, etc.) or other suitable deposition techniques. Openings 44 may be formed in opaque layer 20B to allow light 42 to pass through layer 20 (i.e., openings 44 are illuminated). In regions in which opaque layer 20B is present, light 42 is blocked and layer 20 will be dark in appearance. Layer 20B may be deposited as a coating on layer 20A, may be attached to layer 20A by a layer of adhesive, and/or may be mounted within item 10 adjacent to layer 20A without attaching layer 20B directly to layer 20A.

Figure 14:
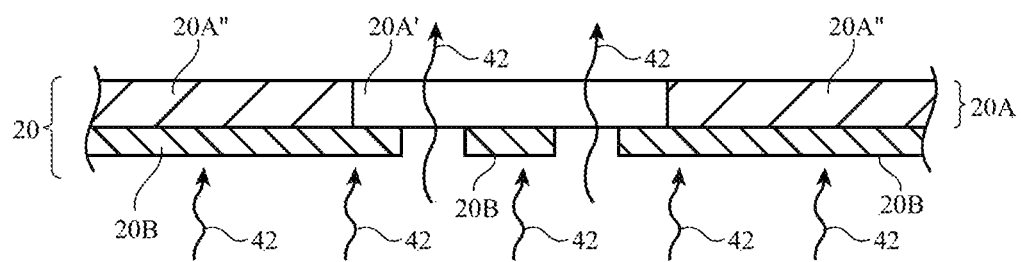
FIG. 14 is a cross-sectional side view of an illustrative opaque fabric with a clear window and a patterned opaque layer in accordance with an embodiment.

If desired, one or more transparent fabric windows or other transparent windows may be formed within an opaque fabric. As shown in FIG. 14, for example, transparent portion 20A' (e.g., a transparent fabric portion) may be formed within opaque fabric portion 20A" of fabric layer 20A. Portion 20A' may have a rectangular shape or other suitable shape. Opaque material 20B may be patterned to form one or more openings 44 that overlap transparent fabric portion 20A'. The shape of openings 44 may form an alphanumeric character or other symbol or other pattern (e.g., a symbol or other pattern that serves as a keyboard key label, other label, or other illuminated shape). Portions of layer 20B may also overlap opaque fabric portions 20A" (e.g., to help prevent light from passing through layer 20A").

Figure 15:
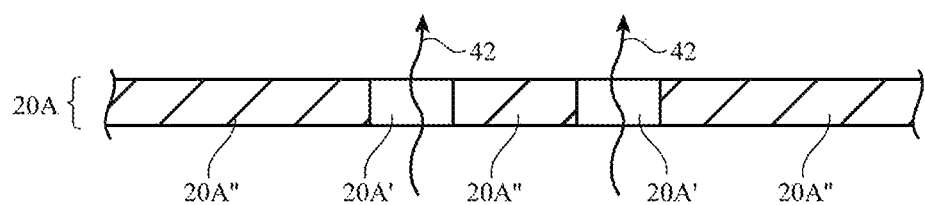
FIG. 15 is a cross-sectional side view of an illustrative opaque fabric with embedded clear fabric portions in accordance with an embodiment.

As shown in the illustrative configuration of FIG. 15, a desired illuminated pattern for item 10 may be formed by forming a pattern of transparent fabric regions 20A' in opaque fabric 20A" (e.g., by weaving, knitting, braiding, etc.). Illumination 42 may pass through the fabric of regions 20A', but will be blocked by the opaque fabric material of regions 20A". Fabric regions 20A' may be patterned to form a symbol or other illuminated shape. Because fabric regions 20A' are transparent and may have the shape of a symbol or other desired shape, regions such as regions 20A' may sometimes be referred to as fabric-filled transparent windows or openings.

Figure 16:
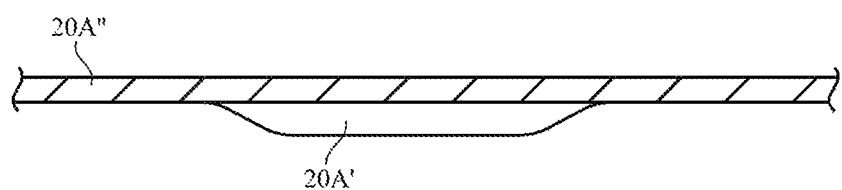
FIG. 16 is a cross-sectional side view of an illustrative opaque fabric layer having an area that overlaps a clear layer in accordance with an embodiment.
Figure 17:
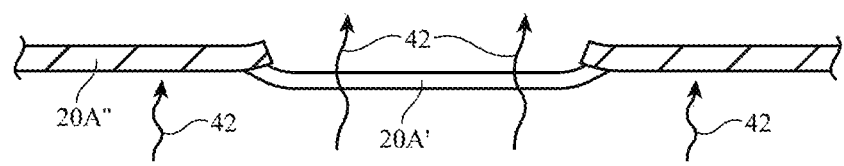
FIG. 17 is a cross-sectional side view of the illustrative opaque fabric layer of FIG. 16 in which material has been removed in an area that overlaps the clear layer so that the clear layer fills an opening in the opaque fabric layer in accordance with an embodiment.

If desired, clear regions of a fabric layer may be formed by fusing or otherwise attaching a transparent layer to an opaque layer. Consider, as an example, the scenario of FIGS. 16 and 17. As shown in FIG. 16, one or more regions of an opaque layer of fabric or other material such as opaque layer 20A" may be provided with a transparent layer of material such as layer 20A'. Layer 20A' may be a layer of fusible transparent fabric or other transparent material (e.g., a sheet of transparent polymer, etc.) and may be attached to layer 20A" using heat (e.g., sufficient heat to fuse the material of layer 20A' to layer 20A"), may be attached using adhesive, may be attached by sewing, or may be attached using other attachment mechanisms. Layer 20A' may also be formed using a printed transparent polymer (e.g., a liquid polymer that is deposited by printing and then cured). Layer 20A' may have the shape of a square or other shape that is sufficiently large to accommodate a printed symbol within its borders as descried in connection with fabric 20A' of FIG. 14 or may be patterned to directly form a symbol or other pattern, as described in connection with FIG. 15.

After forming layers such as transparent layer 20A' in selected area(s) of opaque layer 20A", some or all of the portions of opaque layer 20A" that overlap layer 20A' may be removed to form a transparent pattern in layer 20A" (e.g., a symbol or other shape that is illuminated by light 42). If desired, a layer of opaque material such as patterned opaque layer 20B of FIG. 14 may be deposited on layer 20A' in addition to or instead of forming a desired illuminated shape by selective removal of layer 20A" in the region overlapping layer 20A'.

Figure 18:
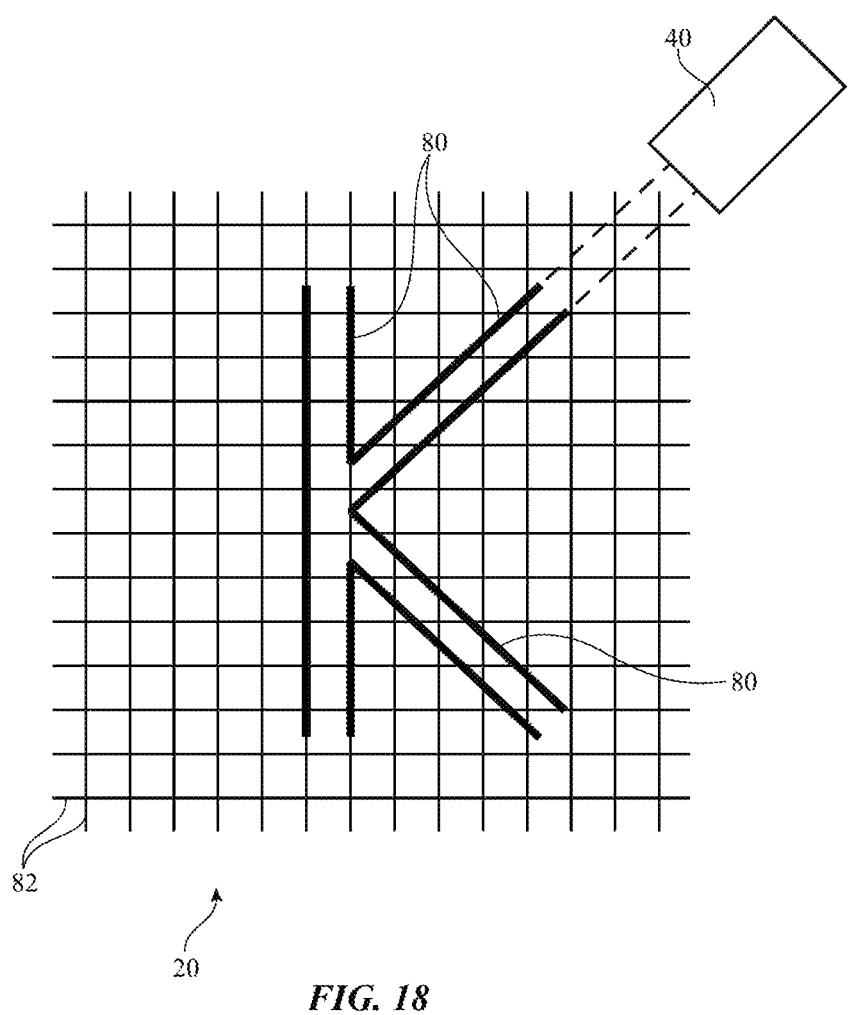
FIG. 18 is a top view of a region of fabric having a label formed from edge lit optical fibers in accordance with an embodiment.

If desired, illuminated symbols and other illuminated shapes may be formed in layer 20 using transparent strands of material that serve as optical waveguides. Consider, as an example, the arrangement of FIG. 18. As shown in FIG. 18, layer 20 may be a fabric layer that includes strands of material such as strands 82. Strands 82 may be opaque and/or transparent. For example, strands 82 may be woven, knitted, or braided to form opaque regions for fabric 20. Transparent strands of material such as transparent strands 80 (sometimes referred to as optical fibers) may be incorporated into selected areas of fabric 20 by weaving, knitting, braiding, embossing, etc. Transparent strands 82 may be formed from glass, clear polymer, or other transparent material. Light source 40 (e.g., a light-emitting diode, etc.) may emit light that is coupled into the ends of one or more of strands 82. Due to the principle of total internal reflection, light 42 from light source 40 may be confined within strands 80 and may be distributed throughout strands 80.

Strands 80 may be incorporated into fabric 20 in a pattern associated with a symbol, label, or other desired pattern (e.g., the illustrative character "K" in the example of FIG. 18). Strands 80 may have roughened surfaces, gratings, or other light scattering features to promote the extraction of the light from strands 80 that has been emitted into strands 80 by light source 40. The incorporation of light scattering features into appropriate portions of strands 80 ensures that strands 80 will emit light outwardly from fabric 20. If desired, an illuminated symbol may be formed by providing strands 80 with light scattering features in selected portions of fabric 20 and/or by covering certain portions of strands 80 with an opaque layer material (fabric formed from opaque strands 82 or other material) while forming patterned openings in the opaque layer of material to form the symbol. If desired, transparent strands of material (optical fibers) may be used in distributing light 42 from light source 40 to openings 44 in fabric 20. For example, a light-distributing fabric formed from transparent strands may serve as a backlight layer for an overlapping opaque fabric layer with openings and/or patterned transparent fabric regions, etc.

Openings 44 in layer 20 (e.g., perforations, symbol-shaped openings, or other openings in a layer of fabric and/or other layer(s) of material) may be filled with polymer or other suitable material. As an example, layer 20 of FIG. 19 may include layer 20A (e.g., a fabric layer) with openings 44 that are covered with a layer of material such as coating 84. Portions of coating 84 may extend partly or completely through openings 44 (i.e., coating 84 may serve as a filler material for openings 44). By filling openings 44 at least partly with coating 84, coating 84 may prevent the intrusion of dust and other foreign material through openings 44 into the interior of item 10. Coating 84 may be formed from translucent or clear polymer or other suitable transparent materials that are sufficiently transparent to allow illumination 42 to pass outwardly from the interior of item 10 through openings 44. In scenarios in which coating 84 is translucent, the material of coating 84 may help diffuse light 42.

Coating 84 may be deposited in liquid form (e.g., using pad printing, screen printing, inkjet printing, or other suitable techniques) and may be cured using ultraviolet light exposure (e.g., when coating 84 is an ultraviolet-light-curable liquid polymer adhesive), may be cured using heat, may be cured using chemical catalysts, etc. Coating 84 may be deposited in rectangular regions on layer 20A (e.g., in scenarios in which the shape of one or more openings 44 is used to define a desired pattern for illumination by light 42) or may be deposited in the shape of a symbol or other pattern. Portions of coating 84 on the surface of layer 20A may have an appearance that contrasts sufficiently with uncoated portions of layer 20A to allow coating 84 to serve as visible coating 44C of FIG. 6 (e.g., to help make a symbol or other shape visible to a user even in the absence of illumination 42).

Figure 19:
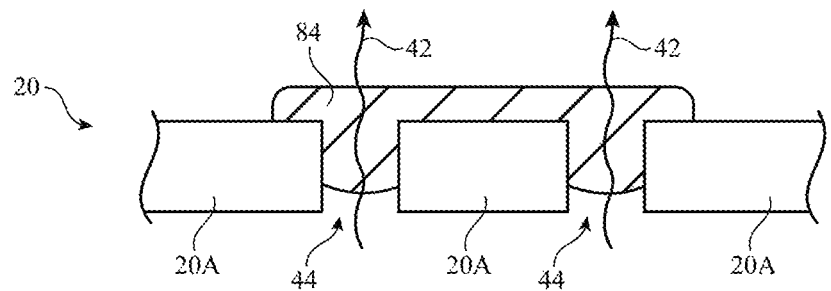
FIG. 19 is a cross-sectional side view of an illustrative fabric layer having illuminated openings and having an upper surface with a region that is covered with a coating layer that overlaps the openings in accordance with an embodiment.
Figure 20:
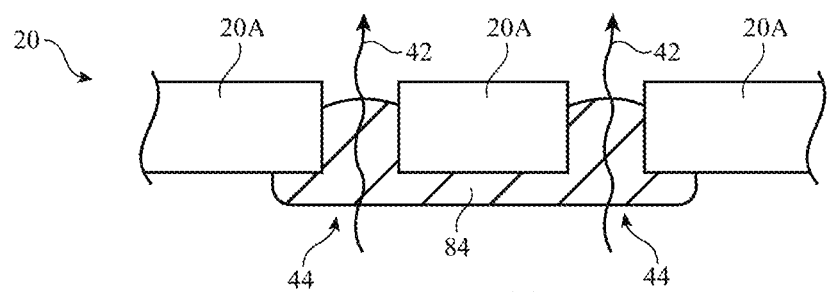
FIG. 20 is a cross-sectional side view of an illustrative fabric layer having illuminated openings and having a lower surface with a region that is covered with a coating that overlaps the openings in accordance with an embodiment.

In the example of FIG. 19, coating 84 has been printed or otherwise deposited onto the upper (outer) surface of layer 20 (e.g., a fabric layer). In the example of FIG. 20, coating 84 has been printed or otherwise deposited onto the lower (inner) surface of layer 20. If desired, coating 84 may cover portions of both the outer and inner surfaces of layer 20, as shown in FIG. 21.

When applying coatings such as coating 84, coating material (e.g., uncured liquid polymer material and/or other material) can be forced into layer 20 (e.g., a fabric layer)

using vacuum pressure. The vacuum pressure may allow the liquid coating material to wick into holes in the fabric. During drying of the liquid coating material (e.g., during polymer curing operations), the liquid polymer can be pressed into the holes in the fabric to ensure that a uniform coating layer is formed and to ensure that the liquid is forced into all holes in the fabric. If desired, a tool such as an autoclave tool may be used to produce a pressure that forces the liquid coating material into the holes in the fabric.

Figure 21:
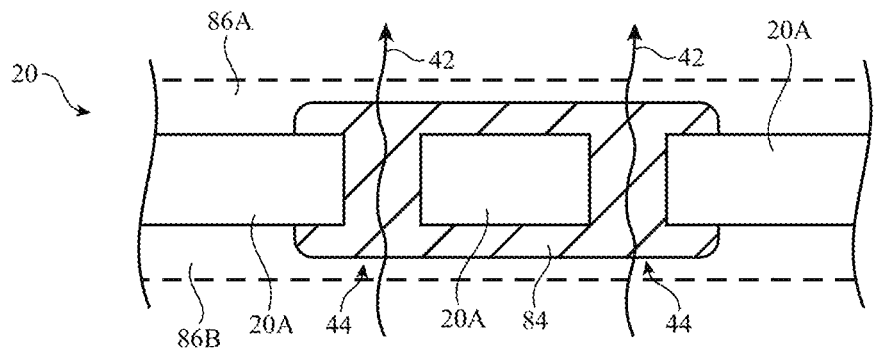
FIG. 21 is a cross-sectional side view of an illustrative fabric layer having illuminated openings and a coating that overlaps portions of the upper and lower surfaces of the fabric layer at the openings in accordance with an embodiment.
Figure 22:
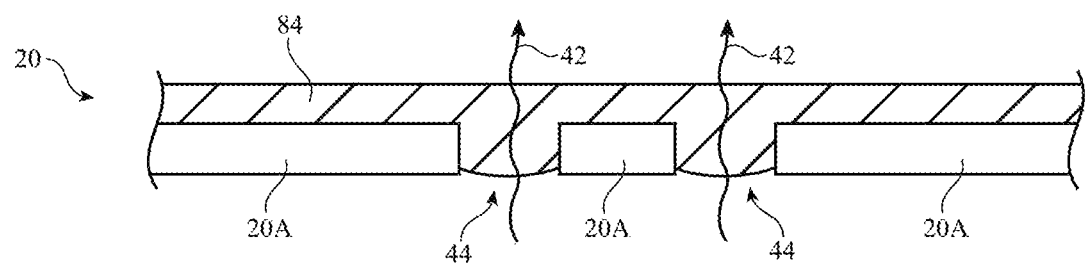
FIG. 22 is a cross-sectional side view of an illustrative fabric layer having illuminated openings and a coating material that extends across the entire surface of the fabric layer in accordance with an embodiment.

In arrangements of the types shown in FIGS. 19, 20, and 21, and/or other arrangements in which coating material is formed on a layer such as fabric layer 20A, it may be desirable to provide layer 20 with one or more protective coating layers such as illustrative outer coating 86A and illustrative inner coating 86B of FIG. 21. Coatings such as coatings 86A and 86B may provide protection to coating 84 and other structures in layer 20 (e.g., to prevent damage from abrasion and other wear, to prevent moisture damage, etc.). Coatings 86A and/or 86B may be formed from transparent material (e.g., haze-free polymer, translucent polymer, inorganic materials, or other suitable materials). If desired, coating material 84 may cover the entire surface (or nearly the entire surface) of fabric layer 20A, including the portions of layer 20A that include openings 44. This type of arrangement is shown in FIG. 22. An optional coating (see, e.g., coating 86A of FIG. 21) may be formed above layer 82 to help protect layer 82, to help pattern illumination 42, etc.

Figure 23:
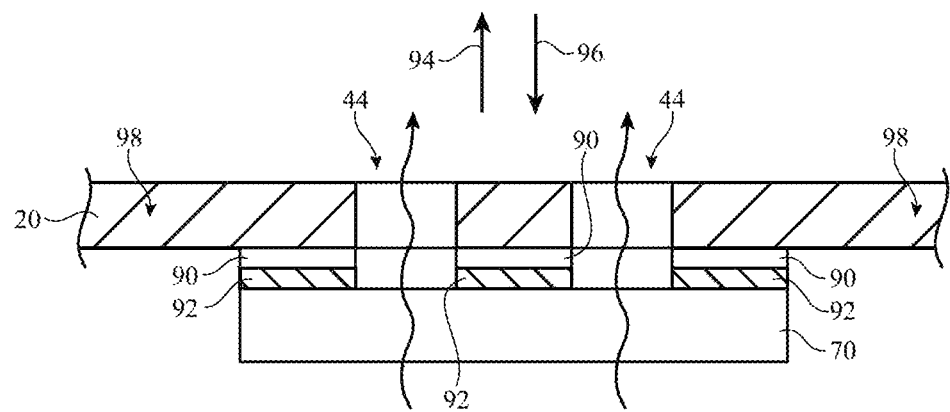
FIG. 23 is a cross-sectional side view of an illustrative fabric layer having illuminated openings aligned with corresponding openings in an underlying opaque layer on a structure such as a movable member for a key or other structure in accordance with an embodiment.

As shown in FIG. 23, a structure such as member 70 may be coupled to the inner surface of layer 20 using adhesive 90. Member 70 may be a movable member. Member 70 may be, for example, a key or button member that is associated with a key in a keyboard, a button that protrudes from a portion of a housing in an electronic device or other fabric-based item 10, a portion of a toggling switch or other movable structure. If desired, structures such as member 70 may include internal support structures, housing portions, or other suitable structures.

Members such as member 70 of FIG. 23 may be formed from plastic, glass, metal, fiber-composite materials, ceramic, and/or other suitable materials. Member 70 may move up in direction 94 and down in direction 96 or may move in other directions. Layer 20 may be a flexible fabric layer having portions 98 that stretch and bend to accommodate movement of member 70 (e.g., movement of a key member associated with a keyboard key as a user presses keys in the keyboard to supply item 10 with input).

Layer 20 (e.g., the fabric and other layer(s) of layer 20) may have openings such as openings 44. Openings 44 may be illuminated by light 42 from light source 40. To allow light 42 to pass through openings 44, member 70 may be formed from transparent plastic, may have openings that allow light 42 to pass to openings 44, and/or may have recesses or other features that prevent member 70 from blocking the passage of light 42 to openings 44. Optional layer 92 may be formed from opaque materials such as colored polymer (e.g., a polymer that contains black particles such as particles of carbon black, other dark particles, non-black colored particles, dye, or other suitable material). Layer 92 may have a pattern that helps define a desired shape for a symbol for member 70 and/or coating 84 may be deposited over and into openings 44 to help define a desired visible symbol. The coating that overlaps and/or protrudes into openings 44 may also help diffuse light 42.

Figure 24:
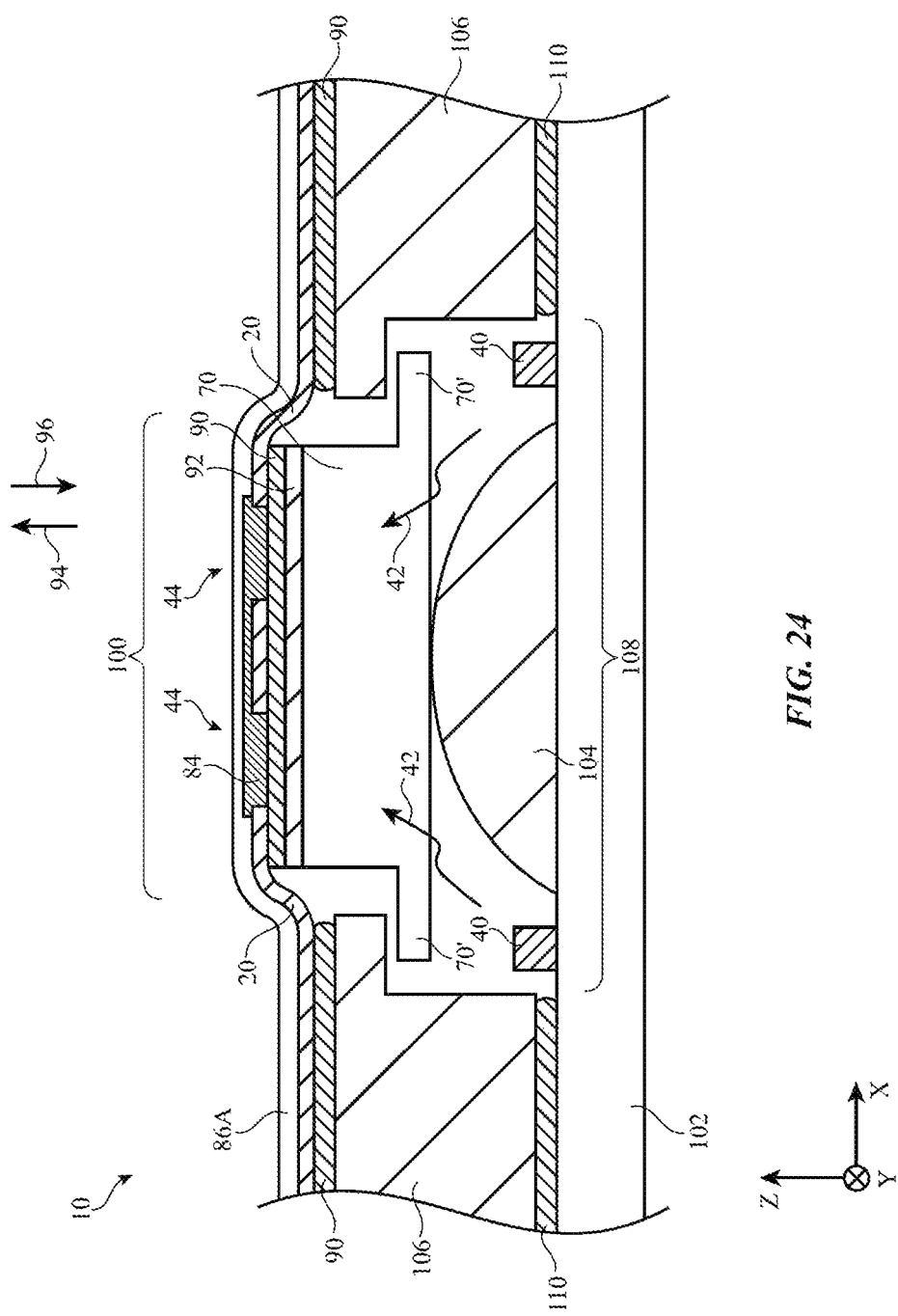
FIG. 24 is a cross-sectional side view of an illustrative keyboard having keys that are covered with a fabric layer having illuminated openings for forming key labels in accordance with an embodiment.

A cross-sectional side view of a portion of fabric-based item 10 in a configuration in which item 10 is an accessory such as a cover for a tablet computer or other electronic device and contains a keyboard is shown in FIG. 24. As shown in FIG. 24, item 10 may have a plastic key member support structure (sometimes referred to as a key web) such as structure 106. A plurality of keys 100 may be formed in item 10. Each key 100 may have a moving key member 70 that is moves in directions 94 and 96 within a respective opening 108 in structure 106. Lip portions 70' of key members 70 and corresponding lip portions 106' of structure 106 may serve as stop structures that help retain key members 70 within openings 108.

Dome switch 104 and, if desired, spring structures may help bias key member 70 in direction 94 when key 100 is not pressed. When key 100 is pressed, the inward force exerted by a user's finger will press key member 70 in inwards direction 96, thereby compressing and activating dome switch 104. Structure 106 may have an array of openings 108 to receive an array of associated key members 70 and an array of corresponding dome switches 104 may be mounted under key members 70. Flexible layer 20 (e.g., a fabric layer) may cover key members 70 and may be attached to structure 106 and key members 70 using adhesive 90.

Layer 20 may contain a layer of fabric with openings 44 that are arranged to form a desired illuminated symbol, label, or other structure for key 100. Coating 84 may be transparent material (translucent, clear, colored, etc.) with an appearance that contrasts visually with the appearance of layer 20. A layer of material such as coating 84 may extend into openings 44 and may have a shape that represents a symbol, label, etc. The shape formed by coating 84 may allow a user to identify key 100 even in the absence of illumination 42. Optional protective layer 86A may be sufficiently transparent to allow a user to view the pattern formed by coating 84 and the pattern of illumination formed when light 42 passes through opening(s) 44. Openings 44 may be perforations and/or larger symbol-sized openings, as described in connection with FIGS. 4, 5, 6, 7, and 8. If desired, a halo structure such as halo 44A of FIG. 4 (e.g., an illuminated ring shape or other trim pattern) may surround each key 100.

Adhesive 110 may be used to attach key member support structure 106 to a substrate such as printed circuit 102. Printed circuit 102 may be a rigid printed circuit board or a flexible printed circuit (e.g., a printed circuit formed from a flexible polymer substrate such as a layer of polyimide or other sheet of polymer). Light sources 40 such as light-emitting diodes or other devices may be mounted to printed circuit board 102 within openings 108 adjacent to dome switch 104 to provide illumination 42 or may be mounted elsewhere within item 10.

The distribution of light 42 that is emitted from light sources 40 may be concentrated in the vicinity of sources 40. If desired, the density of openings 44 may be spatially varied to adjust the intensity of light 42 viewed by the user of item 10. For example, the density of openings 44 may be spatially varied to help even out the intensity of light 42 as light 42 passes through openings 44 and serves as illumination for symbols on keys 100 or other structures for item 10 (i.e., openings 44 may occupy an amount per unit area that varies as a function of distance across fabric 20 to avoid a hotspot when illuminating a keyboard key label associated with key 100 with light source 40).

Figure 25:
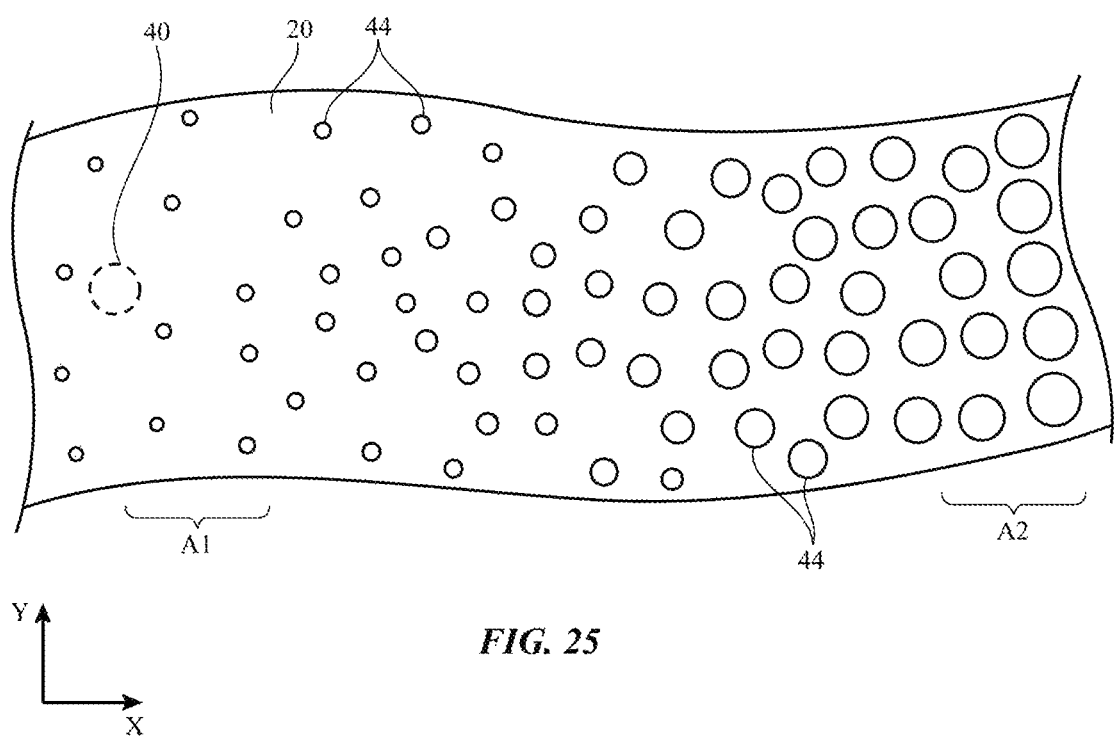
FIG. 25 is a top view of an illustrative fabric layer having an array of openings with a density that varies as a function of distance across the fabric layer in accordance with an embodiment.

As shown in FIG. 25, the density of openings 44 (e.g., opening size and/or number per unit area) may vary as a function of lateral distances X and Y (e.g., in the plane of the illustrative keyboard of FIG. 24). In areas such as area A1 that are relatively near to source 40, the density of openings 44 may be relatively low (i.e., the ratio of the amount of area occupied by openings 44 relative to the area of layer 20 without openings 44 may be relatively small). In areas such as area A2 in the illustrative arrangement of FIG. 25, the intensity of the light emitted by source 40 has decreased due to scattering and spreading of light 42. To compensate for the lower intensity of light 42 below layer 20, layer 20 may be provide with an increased opening area density (i.e., more openings 44 per unit area and/or larger openings 44 per unit area). By varying the opening area density in layer 20, the apparent intensity of illumination 42 to the user of item 10 may appear even with few or no noticeable changes in intensity in different portions of the symbols and other patterns formed by openings 44. If desired, opening density (amount of area occupied by openings 44 per unit area of layer 20) may be varied to create intentional variations in emitted light intensity (e.g., intentional hotspots).

The foregoing is merely illustrative and various modifications can be made by those skilled in the art without departing from the scope and spirit of the described embodiments. The foregoing embodiments may be implemented individually or in any combination.

What is claimed is:

1. A fabric-based item, comprising:
   a light source;
   fabric comprising intertwined strands of material, wherein the fabric has opposing first and second surfaces;
   at least first and second openings in the fabric, wherein the first and second openings are part of an array of openings in the fabric having an alphanumeric symbol shape;
   a coating that overlaps the first and second openings, wherein the coating has a first portion located on the first surface of the fabric and a second portion that extends at least partially through the first and second openings, wherein the first and second openings are illuminated by the light source so that light passes through at least some of the coating, and wherein the alphanumeric symbol shape has a border that aligns with edges of the coating; and
   a movable structure, wherein the first and second openings overlap the movable structure.

2. The fabric-based item defined in claim 1 wherein the movable structure comprises a movable key member for a keyboard key and wherein the alphanumeric symbol shape forms a label for the keyboard key.

3. The fabric-based item defined in claim 1 wherein the light source supplies light that passes through the first and second openings from the second surface to the first surface.

4. The fabric-based item defined in claim 1 further comprising an opaque layer having a patterned opening aligned with at least one of the first and second openings in the fabric.

5. The fabric-based item defined in claim 1 wherein the intertwined strands of material comprise strands of polymer and wherein the first and second openings each comprise a laser drilled opening having sidewalls formed from melted portions of the strands of polymer.

6. The fabric-based item defined in claim 5 wherein the coating comprises a translucent polymer coating.

7. The fabric-based item defined in claim 5 wherein the coating comprises a haze-free clear polymer coating.

8. The fabric-based item defined in claim 1 further comprising transparent material in at least one of the first and second openings.

9. The fabric-based item defined in claim 8 wherein the intertwined strands of material comprise opaque strands of material and transparent strands of material, and wherein the transparent material is formed from the transparent strands of material.

10. The fabric-based item defined in claim 8 wherein the intertwined strands of material comprise opaque strands of material and transparent strands of material, wherein the transparent material is formed from the transparent strands of material, and wherein the fabric-based item further comprises an opaque layer having a patterned symbol-shaped opening that overlaps at least one of the first and second openings in the fabric.

11. A fabric-based item, comprising:
    a light source;
    fabric;
    perforations in the fabric; and
    a coating that overlaps the perforations, wherein the perforations are illuminated by the light source so that light passes through at least some of the coating, wherein the fabric has opposing first and second surfaces, wherein the coating covers at least part of the first surface, wherein the light source supplies light that passes through the perforations from the second surface to the first surface, wherein the coating is patterned to form an alphanumeric symbol that is visible on the first surface, wherein the perforations form a border around an alphanumeric symbol shape that matches the alphanumeric symbol formed by the coating, and wherein the border formed by the perforations aligns with edges of the coating.

12. The fabric-based item defined in claim 11 wherein the alphanumeric symbol comprises a letter and wherein the perforations run along at least one edge of the letter.

13. The fabric-based item defined in claim 11 wherein the alphanumeric symbol comprises a letter and wherein the perforations form an array of perforations covering the letter.

14. Apparatus, comprising:
    a movable member;
    fabric that overlaps the movable member and that has an array of openings overlapping the movable member, wherein the array of openings has a symbol shape and wherein a density of the openings varies as a function of distance across the fabric;
    a light source that illuminates the array of openings;
    transparent polymer in the openings through which light from the light source passes; and
    a key web having a hole that receives the movable member, wherein the array of openings overlaps the hole.

15. The apparatus defined in claim 14 wherein the movable member comprises a keyboard key member for a keyboard key, the apparatus further comprising:
    a printed circuit; and
    a switch on the printed circuit that is controlled by pressing the keyboard key member.

16. The apparatus defined in claim 15 wherein the symbol shape forms a keyboard key label for the keyboard key and wherein the light source illuminates the keyboard key label by providing light to the array of openings.

* * * * *